April 27, 1965 J. RABINOW 3,181,119

READING MACHINE OUTPUT CONTROLLER RESPONSIVE TO REJECT SIGNALS

Filed Nov. 30, 1960

INVENTOR
Jacob Rabinow

BY Joseph A. Genovese
ATTORNEY

United States Patent Office 3,181,119
Patented Apr. 27, 1965

3,181,119

READING MACHINE OUTPUT CONTROLLER RESPONSIVE TO REJECT SIGNALS

Jacob Rabinow, Bethesda, Md., assignor, by mesne assignments, to Control Data Corporation, Minneapolis, Minn., a corporation of Minnesota Filed Nov. 30, 1960, Ser. No. 72,679
10 Claims. (Cl. 340—146.3)

This invention relates to the art of character recognition by reading machines and particularly to systems for increasing the effectiveness of reading machines.

At the present stage of development of the art of character reading by machine, a number of different types of reading machines have been constructed. Occasionally a machine is incapable of reading a character. When this happens a signal is ordinarily given by the machine. The reasons for machine failure to read a particular character, or a group of characters, are inconsequential to my present invention. The importance is that most machines of which I am aware, provide some type of signal when there is a malfunction, such as failure to read a particular character.

An object of my invention is to provide a system for producing an output, compatible with the type of output of the machine, which identifies the character or characters that the machine is incapable of identifying. Although the means to produce the output may be varied, to explain the principles of my invention the means providing the alternate or substitute character identification output signals are described herein as manually operated.

A further object of the invention is to provide a system for monitoring one or more reading machines at an operator station so that when a machine yields a "non-read" signal, an operator may provide information signals identifying the character which the machine did not identify, after which the reading machine is allowed to commence operation.

Other objects and features of importance will become apparent in following the description of the illustrated form of the invention.

To simplify understanding of my invention it is described in connection with conventional reading machines, for instance the machine disclosed in the J. Rabinow et al. pending application Serial No. 32,911, now Patent No. 3,104,369, although other machines such as shown in the J. Rabinow Patent No. 2,933,246 could have been selected. Machines 10 and 12 can be identical or different, however, they provide character identifying outputs on the wires of cables 14 and 16 to utilization devices, such as buffers 18.

Figure 1:
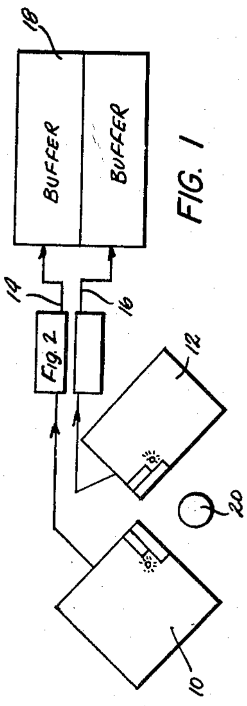
FIGURE 1 is a diagrammatic view showing a plurality of reading machines feeding utilization devices, for instance buffers, and also showing an operator's station from which the readers are accessible.

The two machines are illustrated in FIGURE 1 to show that more than one machine may be serviced by a single operator at station 20. The operator station is a location from which one or more machines are accessible for inspection and control.

Figure 2:
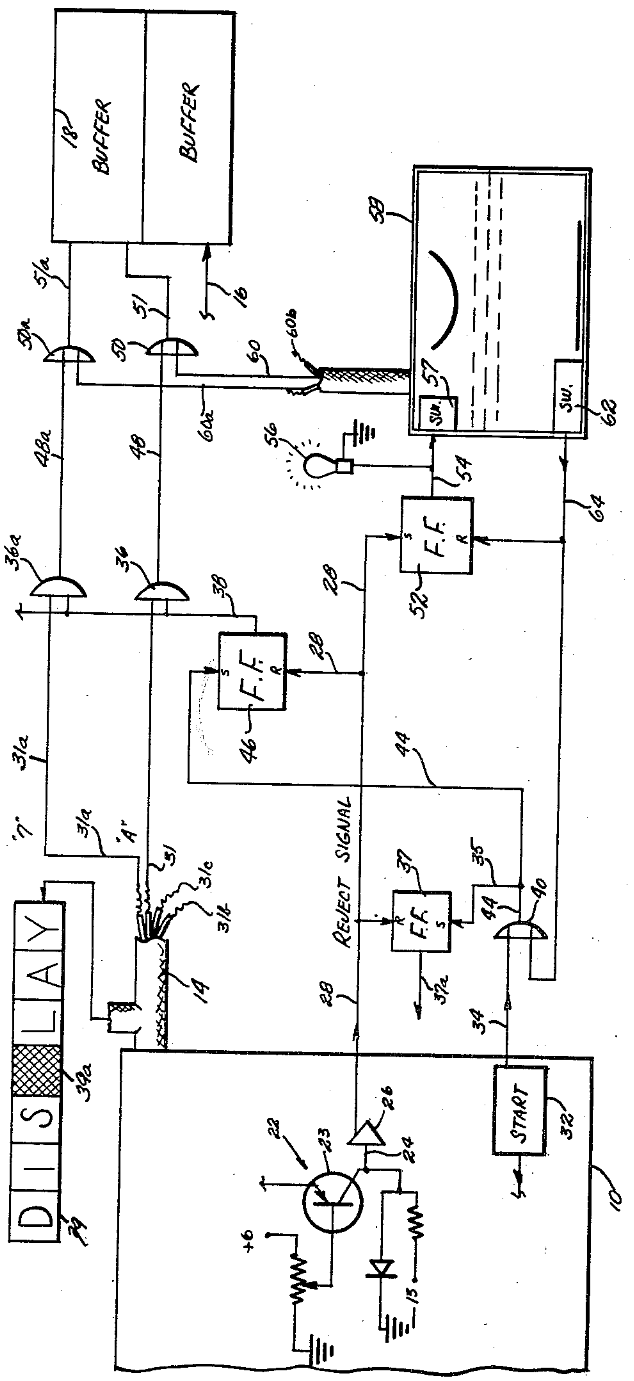
FIGURE 2 is a diagrammatic view showing a part of a typical character reading machine and a utilization device, together with a circuit showing a mode of practicing my invention.

Circuit fragment 22 of machine 10 (FIGURE 2) is reproduced from Patent No. 3,104,369 to show one means to produce a signal indicating a malfunction of the machine. Malfunction, as used herein, is defined as any failure of the machine to identify a character or group of characters. Circuit 22 is fully described in Patent No. 3,104,369. As described, it has a comparator transistor 23 providing a signal on line 24 in response to a reading machine malfunction.

I have shown character identification signal wires 31, 31*a*, 31*b*, etc., in cable 14. There is one wire for each character. When a character is identified by machine 10, only the proper wire changes voltage level, e.g., the wire 31 for "A" or 31*a* for "7." This information may be used to signify the read character in any way. Since reading machines are often used as input devices for digital computers, it is assumed that the output information on the wires 31, 31*a*, 31*b*, etc. (FIGURE 2) is binary, although the information may be in any other form. The reading machine has some means ("start" 32) to start the machine.

I shall now describe my invention and how it operates. The start 32 signal is given thereby setting the reading machine into operation. The document handling mechanism of the machine is actuated. This step is schematically shown by the start signal on line 34, OR gated at 40 and providing a signal on lines 44, 35 that sets flip flop 37. The output wire 37*a* of the flip flop conducts a signal to start the mechanism. The nature of the document handling mechanism is not important to my present invention. For instance, it may be a sheet handling device such as shown in Patent No. 3,069,494 or any other suitable mechanism.

The reader outputs are conducted on lines 31, 31*a*, 31*b*, etc., to respective AND gates 36, 36*a*, etc., as one input to each. Common line 38 is the other input to gates 36, 36*a*, etc. The start signal on line 44 sets flip flop 46. Since flip flop 46 is so set, it will provide an output on line 38, and there will be coincidence of signals on one of the wires 31, 31*a*, etc., and line 38 at one of the AND gates 36, 36*a*, etc., depending on the identity of the read character. This enables the reader outputs to be conducted on line 48, or 48*a*, etc., from AND gate 36, or 36*a*, etc. The reader output information on lines 48, 48*a*, etc., is applied to OR gates 50, 50*a*, etc., whose output lines 51, 51*a*, etc., effectively form continuations of lines 31, 31*a*, etc. Accordingly, when the normal start signal 32 of the reading machine is given, my circuitry will permit the reader outputs to be conducted to the buffer 18.

Let us now assume that a malfunction (e.g. character-reject) signal, such as for a failure to read a particular character, appears at line 24. It is amplified at 26 and conducted on line 28 to reset flip flop 37 and stop the sheet handling mechanism. It also resets flip flop 46 thereby inhibiting one of the inputs to all of the AND gates 36, 36*a*, etc. The result is that as soon as the reject signal is given, reader outputs on lines 31, 31*a*, etc., are prevented from passing gates 36, 36*a*, etc., and entering buffer 18. In high speed sheet handling mechanisms which also provide for scan motion, as in Patent No. 3,069,494, stopping may not be instantaneous. The sheet may be moved a short distance so that a few characters will be scanned after the character which the machine failed to identify. These few characters will provide signals on lines 31, 31*a*, 31*b*, etc., but they will be inhibited at gates 36, 36*a*, etc. If the reading machine is not already equipped with a display device for the identified characters, I provide a conventional display device 39 for the operator at station 20. It is connected with the lines 31, 31*a*, 31*b*, etc., so that the operator can see the displayed place 39*a* where the reader failed, and a few characters on both sides of the failure. Thus the operator can easily look at the sheet being read and ascertain the non-read character by comparing the displayed characters with the corresponding characters on the sheet.

The reject signal on line 28 also sets flip flop 52 so that a signal appears on its output line 54. The signal on line 54 may be used to energize an audible or visual device 56 such as a lamp, to obtain the attention of the operator at station 20. In addition, there are alternate means for providing reader outputs compatible with the type of output of the reading machine 10. Since we are discussing binary systems, the alternate means shown consist of a binary typewriter 58 used as a signal generator. The binary typewriter is turned on by switch 57 to which the output line 54 of flip flop 52 is connected. The typewriter, when operated, produces binary signals on lines 60, 60*a*, etc., to identify characters in binary code. The typewriter is located at station 20 (FIGURE 1) and is operated by a person monitoring the operation of the reading machines. It is now evident that when a reject signal is given by the reading machine 10, the binary typewriter 58 is switched on so that the operator may use it to furnish character identifying outputs on lines 60, 60*a*, etc., which are applied to the proper OR gates 50, 50*a*, etc., and fed on lines 51, 51*a*, etc., to the buffer.

The operator may type in the unread character, or that character plus those displayed at 39 to the right of 39*a* thereby filling in those characters, past which the scanner and sheet containing the characters moved after the "stop" signal. In such a case the machine could be started precisely at the right place for continued operation. Another alternative is to instruct the operator to type in the balance of the line of characters, starting with the non-read character 39*a*, so the machine could be started on the next line on the sheet.

After the operator types information identifying the character or characters in any of the above ways, the operator actuates switch 62 of the binary typewriter to provide a signal on line 64. This signal serves two functions. It is applied to flip flop 52 to reset it to the nonconducting condition, and it is applied to OR gate 40 as a substitute "Start" signal. Since a start signal is provided to gate 40, there is an output on line 44 to again set flip flop 37 to start the sheet handling mechanism and again set flip flop 46 so that the normal outputs of reader 10 on lines 31, 31*a*, etc., will coincide with the signal on line 38 at gates 36, 36*a*, etc. Consequently the normal reader outputs are now available on lines 48, 48*a*, etc., so that they may be fed to buffer 18.

The preceding description discloses the principle of my invention. It is evident that the circuitry disclosed herein is given by way of example only, and that many of the circuits using computer techniques may be resorted to to achieve essentially the same results. Further, I have selected the wires of reader output line 14 as convenient for switching in the alternate information generated by a human operator upon a malfunction of one type or another of the reading machine. Other circuits internally of a reading machine may be selected. Moreover, one alternate output generator 58 may easily be used to service a number of readers by switching its output lines to the reader in need thereof. Many other variations may be made without departing from the comprehension of my invention and the scope of the following claims.

I claim:

1. In combination, a character reading machine providing outputs identifying the characters that are read and also providing a signal indicating that a character is rejected by said machine, and means to conduct said outputs to a utilization device; manually operable means to produce a character identifying output defining the rejected character when said signal is given, and means for conducting the last-mentioned output from said manually operable means to the same utilization device to occupy the place in said utilization device which would have been occupied by the rejected character if it had been identified by the machine.

2. In combination with a character reading machine which provides outputs corresponding to the characters that are read, and which provides a reject signal when the reading machine fails to read a character; means responsive to said signal for stopping the reading of the machine, operator controlled means operative after and responsive to said signal for providing the same kind of outputs provided by the reading machine so that the character which is not read by the machine may be read by an operator of said operator controlled means, means associated with said operator controlled means for yielding a start signal for the reading machine, and conductive means to impress said start signal on the machine.

3. In a reading machine complex having more than one character reading machine and an operator station, where each machine produces character identifying outputs and has means to produce a reject signal indicating a failure of either machine to read a character, the improvement comprising; a manually operable output generator accessible to an operator at said station for the operator to manually provide outputs of a type similar to the reading machines outputs, means responsive to said signal for stopping the reading of the machine which failed to read a character, and means at said station for providing a signal to resume operation of the last-mentioned reading machine.

4. In a character recognition machine providing outputs corresponding to the characters identified by the machine and also providing a reject signal upon failure of the machine to read a character; means responsive to said signal for inhibiting further outputs from the machine after said signal, alternate means for producing character identifying outputs to replace the outputs of the machine with a substitute output identifying the character which caused the machine to yield said reject signal, and means operable after said alternate means for rendering said inhibiting means ineffective thereby enabling further machine outputs to pass said inhibiting means.

5. The subject matter of claim 4 and means responsive to said outputs to display the read characters by which to ascertain which character was responsible for the reject signal.

6. In combination with a character reading machine providing normal outputs identifying the characters on a plurality of lines for a utilization device, and having means to provide a reject signal indicating a failure of the machine to identify a character, the improvement comprising inhibit means responsive to said signal to inhibit further normal outputs on said lines, means rendered operable in response to said reject signal for generating a substitute output for the character responsible for said signal, means for conducting the substitute output to the utilization device in a place following the last normal output, and means for thereafter rendering said inhibit means ineffective thereby enabling subsequent normal outputs over said lines to pass to the utilization device.

7. In a character reading machine providing outputs which identify characters and providing a reject signal when the machine rejects a character, and means to conduct said outputs to a utilization device; means to display the identified characters to provide a visual manifestation from which the position and sometimes the identity of the rejected character can be accertained by a human operator, manually operable means for providing a substitute output corresponding to the rejected character, and means to conduct said substitute output to said utilization device.

8. In a character reading machine having means providing character-identity outputs corresponding to the identified characters, and also having means to provide a reject signal signifying that a character has been rejected by the machine, the improvement comprising; signal generator means to provide substitute character-identity outputs, means responsive to said reject signal providing means for rendering said generator means operative so that the generator means may be actuated to provide a substitute character-identity output after said reject signal, means also responsive to said reject signal for inhibiting the outputs of the reading machine to allow said substitute output to follow the last character that is correctly-identified by the reading machine, gating means following said inhibiting means to gate the character-identity outputs and said substitute output into a utilization device, and means for rendering said inhibit means ineffective after said substitute output, the last mentioned means enabling the reading machine outputs to continue after the said substitute output is generated by said generator means.

9. The subject matter of claim 8 and means associated with said reading machine to display successive characters as they are identified by said reading machine outputs, said display means manifesting more than one character simultaneously and also manifesting the position that would be occupied by the rejected character if the rejected character had been identified by the reading machine.

10. The subject matter of claim 8 wherein said generator means includes means for manual operation thereof so that said substitute output may be manually keyed into said gating means in its correct position with respect to the other characters.

References Cited by the Examiner

UNITED STATES PATENTS

| | | | |
|---|---|---|---|
| 2,552,156 | 5/51 | France | 340—146.3 |
| 2,677,815 | 5/54 | Brustman | 340—146.3 |
| 2,714,201 | 7/55 | Whitehead | 340—149 |
| 2,774,056 | 12/56 | Stafford et al. | 340—149 |
| 2,807,005 | 9/57 | Weidenhammer | 340—146.3 |
| 2,875,951 | 3/59 | Schreiner | 340—146.3 |
| 2,906,819 | 9/59 | Smith | 340—146.3 |
| 2,950,464 | 8/60 | Hinton et al. | 340—149 X |
| 3,009,064 | 11/61 | Cook | 340—146.3 |
| 3,089,123 | 5/63 | Hennis et al. | 340—146.3 |
| 3,105,956 | 10/63 | Greanias | 340—146.3 |
| 3,119,980 | 1/64 | Schreiner | 340—146.3 |

OTHER REFERENCES

The Analyzing Reader Character Sensing Technique, by C. C. Heasly, Jr., published by Intelligent Machines Research Corp., June 17, 1954.

MALCOLM A. MORRISON, *Primary Examiner.*

ELI J. SAX, *Examiner.*